(12) United States Patent
Held, III et al.

(10) Patent No.: US 7,204,890 B2
(45) Date of Patent: Apr. 17, 2007

(54) PROCESS FOR REMOVING FINE PARTICULATE SOIL FROM HARD SURFACES

(75) Inventors: Theodore D. Held, III, Grosse Pointe Farms, MI (US); Gerald J. Cormier, Oxford, MI (US); William E. Fristad, Rochester Hills, MI (US)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 317 days.

(21) Appl. No.: 10/182,480

(22) PCT Filed: Jan. 19, 2001

(86) PCT No.: PCT/US01/02870

§ 371 (c)(1),
(2), (4) Date: Dec. 9, 2002

(87) PCT Pub. No.: WO01/54836

PCT Pub. Date: Aug. 2, 2001

(65) Prior Publication Data

US 2003/0211962 A1    Nov. 13, 2003

Related U.S. Application Data

(60) Provisional application No. 60/179,228, filed on Jan. 31, 2000.

(51) Int. Cl.
*B08B 7/00* (2006.01)

(52) U.S. Cl. .............. 134/40; 134/6; 134/26; 134/27

(58) Field of Classification Search .......... 134/6, 134/26, 27, 40
See application file for complete search history.

(56) References Cited

U.S. PATENT DOCUMENTS

| | | | |
|---|---|---|---|
| 3,079,284 A * | 2/1963 | Boucher et al. ............. 134/4 |
| 4,586,962 A * | 5/1986 | Barabas ..................... 134/4 |
| 4,622,075 A * | 11/1986 | Bogner ................... 134/22.14 |
| 4,652,393 A * | 3/1987 | Ely et al. ................. 252/79.5 |
| 4,900,364 A | 2/1990 | Diedrich ..................... 134/4 |
| 5,030,290 A * | 7/1991 | Davis ........................ 134/4 |
| 5,120,369 A | 6/1992 | Malotky ..................... 134/4 |
| 5,389,283 A | 2/1995 | Held, III ............... 252/174.19 |
| 5,505,787 A | 4/1996 | Yamaguchi ................... 134/4 |
| 5,585,340 A | 12/1996 | Held, III ................... 510/244 |
| 5,690,749 A * | 11/1997 | Lee ........................... 134/6 |
| 5,891,261 A * | 4/1999 | Mizukawa et al. ........... 134/19 |
| 5,993,561 A | 11/1999 | Jarema ....................... 134/7 |
| 6,325,862 B1 * | 12/2001 | Otsuki ........................ 134/7 |

FOREIGN PATENT DOCUMENTS

JP        2003192751 A  *   7/2003

* cited by examiner

*Primary Examiner*—Sharidan Carrillo
(74) *Attorney, Agent, or Firm*—Stephen D. Harper; Mary K. Cameron

(57) ABSTRACT

Many prior art processes for cleaning predominantly organic hard surfaces have been found to be considerably less effective in removing very fine particles on such surfaces than are the best cleaners for metallic surfaces. However, it has been found, and forms the basis of this invention, that fine particles can be removed effectively from organic surfaces by an indirect process of first forming a thin solid coating over the surface and then removing the solid coating, into which the fine particles that formerly contaminated the surface to be cleaned have presumably become incorporated. Substantially hydrolyzed poly(vinyl acetate) has been found particularly useful for forming the thin solid coating when this coating is to be removed by treatment with an acidic aqueous solution; acrylate polymers are preferred if the solid coating is to be removed by an alkaline aqueous solution. In either instance, in order to obtain good wetting without damaging the surface to be cleaned, the material that forms the bulk of the solid coating is preferably applied to the surface to be cleaned in an aqueous solution or dispersion that also contains surfactant molecules that include imidazoline moieties. A method of quantifying the degree of removal of solid particles is also provided.

10 Claims, No Drawings

PROCESS FOR REMOVING FINE PARTICULATE SOIL FROM HARD SURFACES

This application claims priority from International application No. PCT/US01/02870, filed 29 Jan. 2001 and published in English under PCT Article 22, and from U.S. provisional application Ser. No. 60/179,228, filed 31 Jan. 2000, the entire disclosure of each of these applications being incorporated by reference herein in its entirety.

FIELD AND BACKGROUND OF THE INVENTION

The invention relates to cleaning hard surfaces, particularly plastics, dried paint, and other surfaces for which the chemical substance or substances that constitute the surfaces are insoluble in, and not damaged by contact with, water and usually are predominantly organic.

Current and prior art in this field generally relies on cleaning surfaces initially with organic solvents and/or with a variety of aqueous solutions that usually contain wetting agents, other surfactants to disperse oily and waxy soils, and alkalinizing or acidizing agents. These initial liquid cleaning compositions are usually brought into contact with the surfaces to be cleaned by immersion or relatively gentle spraying of the liquid cleaning composition onto the solid surface to be cleaned. Such methods are usually effective for cleaning most metals, in part because the aqueous solutions used can be and usually are formulated to slowly dissolve the metal surface being cleaned, thereby detaching much of the soil by dissolving the part of the surface to which the soil is attached. No suitable analog of such aqueous solutions that is effective on most organic surfaces is known, however. Accordingly, in cleaning organic surfaces reliance must be placed primarily on the chemical nature and temperature of the chemical cleaner liquid, and, to some extent, on agitation, spray impingement, or other mechanical means that will cause relative motion between the cleaner liquid and the surface to be cleaned. (Although one of the rinsing stages often used in cleaning plastics is generally called "power rinsing" or "power washing" and is in fact somewhat more effective than ordinary rinsing, neither its mechanical force nor any other characteristic of the rinsing, as contrasted to the cleaning, stage of a typical industrial cleaning process has been found in practice to contribute significantly to fine particle removal; these particles must be removed by the end of the exposure of the surface to a chemical cleaner, or they normally will not be removed at all.) Prior art chemical cleaners have proved satisfactory for many purposes, including much cleaning of plastic articles prior to painting them.

Cleaning of plastics for some uses, however, has not yet been satisfactorily achieved by these means of the prior art. For example, plastic headlight housings for automobiles are often sputter coated with metal after the housings have been cleaned, in order to create a parabolic reflective surface that will focus toward the forward direction the beams of the headlight later installed in the housing. No cleaning technique available from the prior art has been found to be entirely satisfactory for this use. Other examples of dissatisfaction with currently available techniques for cleaning surfaces exist in the electronics and aerospace industries.

Accordingly, an object of the present invention is to provide satisfactory cleaning of hard surfaces by liquid cleaners in instances in which currently available methods are not satisfactory because of their inability to remove fine particles from the surface cleaned.

Except in the claims and the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred, however. Also, throughout the description, unless expressly stated to the contrary: percent, "parts of", and ratio values are by weight or mass; the term "polymer" includes "oligomer", "copolymer", "terpolymer" and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description or of generation in situ within the composition by chemical reaction(s) noted in the specification between one or more newly added constituents and one or more constituents already present in the composition when the other constituents are added, and does not preclude unspecified chemical interactions among the constituents of a mixture once mixed; specification of constituents in ionic form additionally implies the presence of sufficient counterions to produce electrical neutrality for the composition as a whole and for any substance added to the composition; any counterions thus implicitly specified preferably are selected from among other constituents explicitly specified in ionic form, to the extent possible; otherwise such counterions may be freely selected, except for avoiding counterions that act adversely to an object of the invention; the word "mole" means "gram mole", and the word itself and all of its grammatical variations may be used for any chemical species defined by all of the types and numbers of atoms present in it, irrespective of whether the species is ionic, neutral, unstable, hypothetical, or in fact a stable neutral substance with well defined molecules; the term "paint" and all of its grammatical variations include all materials known by more specialized names such as "lacquer", "varnish", "shellac", "primer", "electropaint", "top coat", "color coat", "clear coat", "autodeposited coatings", "radiation curable coatings", "cross-linkable coatings", and the like and their corresponding grammatical variations; and the terms "solution", "soluble", "homogeneous", and the like are to be understood as including not only true equilibrium solutions or homogeneity but also dispersions that show no visually detectable tendency toward phase separation over a period of observation of at least 100, or preferably at least 1000, hours during which the material is mechanically undisturbed and the temperature of the material is maintained within the range of 18–25° C.

BRIEF SUMMARY OF THE INVENTION

It has been found that a major cause of the failures of satisfaction from the present methods of cleaning hard surfaces is the failure of current methods to remove very fine particles that tightly adhere, even without physical attachment, to the surfaces that are to be cleaned. It has further been found that removal of these very fine particles (and of other soils) can be achieved by a process comprising at least the following operations:

(I) forming over the surface to be cleaned a solid coating; and (II) removing the solid coating that was formed in operation (I) as described immediately above by contacting the solid coating with a liquid that dissolves, disperses, or both dissolves and disperses the solid coating during the time of said contacting.

Other embodiments of the invention include processes that include at least one additional operation combined with those described above, articles including surfaces cleaned by a process according to the invention, compositions that are particularly useful in forming preferred solid coatings over the surface to be cleaned as recited in operation (I) above and/or are particularly useful in removing such a solid coating, and methods of quantifying the extent of removal of fine particles from a hard surface in a process according to the invention.

DETAILED DESCRIPTION OF THE INVENTION AND PREFERRED EMBODIMENTS

At least for convenience and economy, necessary operation (I) of a process according to the invention is preferably accomplished by performing the following suboperations:

(I.1) forming over the solid surface to be cleaned a liquid coating of a first cleaning liquid that has both of the following properties:

the entire first cleaning liquid is a homogeneous liquid under the conditions of temperature and atmospheric pressure in effect when the composition is applied to the surface to be cleaned to form said liquid coating thereover; and at least a portion of the first cleaning liquid can be transformed to a continuous coherent solid by a solidification process that:

does not damage the surface to be cleaned;

can be applied to any specified mass of the first cleaning liquid, irrespective of whether the first cleaning liquid is formed into a liquid coating on the surface to be cleaned or is otherwise maintained in a volume having a specified shape and size; and when so applied produces a mass of solid from the first cleaning composition, said mass of solid having a ratio to the mass of the first cleaning liquid from which it was solidified, said ratio being independent of the size and shape of the volume of first liquid cleaning composition from which it was produced, said ratio further being hereinafter usually designated as the "solids fraction" of said first cleaning liquid; and when applied to a liquid volume of said first cleaning liquid that has the form of a right cylinder with a base area of at least one square centimeter and a height in millimeters that is at least equal to one half of the reciprocal of the solids fraction of the first cleaning liquid, causes said liquid volume to be transformed to a continuous solid object with at least sufficient coherence to maintain itself as a single solid object against the force of natural gravity at the place where the coating operation is being performed; and (I.2) applying to the liquid coating of first cleaning liquid formed in sub-operation (I.1) said solidification process, whereby said liquid coating is converted to said solid coating.

It will be appreciated by those skilled in the art that a wide variety of materials, including completely non-aqueous liquids, may be used to constitute the first cleaning liquid as described above. For example, the first cleaning liquid could be: a spontaneously curing liquid such as a liquid epoxy resin mixed with a liquid curing agent, in which instance the solidification process could simply be the passage of time at a suitable temperature; a liquid that will polymerize to a solid under an influx of radiation, in which instance the solidification process could be supplying the influx of radiation; or the like. Normally most preferred, however, for reasons of economy and convenience, is a dispersion, solution, or both dispersion and solution in water of at least one organic substance, usually but not necessarily a synthetic polymer and usually called hereinafter an "essential solid-forming substance" if it is not part of any of the optional components of a first cleaning liquid as described below, that is solid after being separated from the water in which it is dissolved, dispersed, or both, in which instance the solidification process preferably is simply drying the liquid coating.

Preferences for particular organic essential solid-forming substances in this preferred embodiment of the invention are dependent on the chemical nature of the liquid used in operation (II) of a process according to the invention as described above, this liquid being often designated hereinafter as the "second cleaning liquid". In most instances, when the substrate to be cleaned is one of the common plastics or dried paint, aqueous based second cleaning liquids with a pH value between 1.0 and 6.1 are preferred. More particularly preferred are second cleaning liquids that are taught as plastic cleaners by one of U.S. Pat. Nos. 5,585,340 and 5,389,283, the entire disclosures of both of which, except to any extent that they may be inconsistent with any explicit statement herein, are hereby incorporated herein by reference.

When the second cleaning liquid is aqueous with a pH value between 1.0 and 6.1, this condition being understood to apply to all the remaining parts of this description prior to the description of specific examples until specifically changed, the essential solid-forming organic substance(s) in a first cleaning liquid as described above preferably is/are selected from the group consisting of poly(vinyl pyrrolidone), at least partially hydrolyzed poly(vinyl acetate) (alternatively called "poly(vinyl alcohol)"), gelatin, and "soluble nylon" (i.e., polyamides with a low degree of polymerization, generally between 2 and 3, which are water-soluble). For maximum effectiveness in removing fine particles, at least, with increasing preference in the order given, 10, 20, 30, 35, 40, 45, or 50% of the solid-forming organic substance(s) is selected from the group consisting of soluble nylon and partially hydrolyzed poly(vinyl acetate). At least for economy, partially hydrolyzed poly(vinyl acetate) is most preferred.

Whenever partially hydrolyzed poly(vinyl acetate) is utilized as a part of the essential solid-forming organic substance(s) in a composition or process according to this invention, independently for each characterization stated:

the degree of hydrolysis of the partially hydrolyzed poly(vinyl acetate) preferably is at least, with increasing preference in the order given, 50, 60, 65, 70, 75, 77, 79, 81, 83, 85, or 87% and independently preferably is not more than, with increasing preference in the order given, 99, 97, 95, 93, 91, or 89%;

the weight average molecular weight of the partially hydrolyzed poly(vinyl acetate) preferably is at least, with increasing preference in the order given, $2\times10^4$, $4\times10^4$, $6\times10^4$, $8\times10^4$, $10\times10^4$, or $12\times10^4$ and independently preferably is not more than, with increasing preference in the order given, $50\times10^4$, $40\times10^4$, $30\times10^4$, $25\times10^4$, $23\times10^4$, $21\times10^4$, or $19\times10^4$; and if partially hydrolyzed poly(vinyl acetate) is the only essential solid-forming substance in a working first cleaning liquid as described above, the concentration of partially hydrolyzed poly(vinyl acetate) in the first cleaning liquid preferably is at least, with increasing preference in the order given, 0.2, 0.4, 0.6, 0.8, 1.0, 1.5, 2.0, or 2.5 percent and independently, at least for economy, preferably is not more than, with increasing preference in the order given, 10, 7, 5, 4.0, or 3.5 percent.

If other essential organic solid-forming substances are mixed with partially hydrolyzed poly(vinyl acetate) or used alone in a first cleaning liquid as described above, the concentration preferences stated last above for partially hydrolyzed poly(vinyl acetate) alone also apply to the total of essential solid-forming organic substances that are used in a first cleaning liquid according to the invention.

No ingredients other than water and one or more substances that will form a solid coating are necessary for a first cleaning liquid according to this preferred embodiment of the invention, but at least two other ingredients are usually preferred individually and more preferred jointly. These are (i) a wetting agent to facilitate uniform coverage of a surface to be cleaned in a process according to the invention and (ii) a preservative agent to guard against growth of micro-organisms.

A wide variety of surfactants can be used as wetting agents, as generally known per se in the art. However, one consideration that does not often if ever arise in connection with metal cleaning limits the practical value of some otherwise suitable wetting agents: Many of them are capable of being absorbed, to a sufficient degree that the surface being cleaned is roughened, swollen, made tacky, or otherwise damaged, into some of the plastics and other surfaces commonly cleaned by a process according to this invention. In order to avoid this undesired result, in a first cleaning liquid as described above, amphoteric surfactants are preferred over those surfactants that are nonionic, only cationic, or only anionic. A preferred type of amphoteric surfactant is constituted of molecules that have in each molecule:

at least one continuously chemically bonded chain or ring of atoms in which there are at least two carbon atoms and at least two heteroatoms; and at least one hydrophobe moiety that satisfies all of the following conditions:
  it has not more than two open valences;
  it has a number of carbon atoms that is at least 8 and, unless the surfactant includes an imidazoline moiety, more preferably is at least, with increasing preference in the order given, 10, 12, 14, or 16;
  it contains no atoms other than carbon, hydrogen, nitrogen, oxygen, phosphorus, sulfur, and halogens and preferably, primarily for reasons of economy, contains no halogen atoms or more preferably no halogen, phosphorus, or sulfur atoms; and
  if it contains any atoms of nitrogen, oxygen, phosphorus, or sulfur, it contains such atoms in a number having a ratio to the number of carbon atoms in said hydrophobe moiety that is not more than, with increasing preference in the order given, 0.34:1.0, 0.30:1.0, 0.25:1.0, 0.20:1.0, 0.15:1.0, 0.10:1.0, or 0.05:1.0.

A particular type of surfactant that is still more preferred for a first cleaning liquid as described above is one in which:
each molecule includes a substituted imidazoline moiety;

there is a hydrophobic moiety attached to the carbon atom in said imidazoline moiety that is directly bonded to both nitrogen atoms in the imidazoline moiety; and, optionally and preferably, there is also at least one, or more preferably at least two, substituent moieties bonded to nitrogen atom(s) in the imidazoline moiety, these substituent moieties being selected from the group consisting of:
  hydroxyalkyl moieties, preferably hydroxymethyl and hydroxyethyl moieties, more preferably the latter;
  moieties derived from carboxylic acids by removing from each molecule thereof one hydrogen atom that is not the one that is part of the characteristic —COOH moiety of a carboxylic acid, preferably those derived from propanoic or 2-methyl propanoic acid, more preferably the former; and
  carbonate moieties.

2-Alkylimidazoline-moiety-containing surfactants of this type favor good wetting of most surfaces. One particularly preferred example of this type of surfactant is one available commercially from Mona Industries under the name "MONATERIC™ Cy Na 50" and reported by its supplier to be a 50% solution in water of the sodium salt of 3-[1-(2-hydroxyethyl)-2-capryl-3-imidazolinyl] propanoic acid. Another particularly preferred embodiment of this type of surfactant is one available commercially from Lonza, Inc. under the name "AMPHOTERGE™ KJ-2" and reported by its supplier to be a 40% solution in water of substituted imidazoline dicarboxylate molecules.

Irrespective of the exact chemical nature of the active wetting agent, its concentration in a first cleaning liquid as described above preferably is at least, with increasing preference in the order given, 0.4, 0.8, 1.2, 1.4, 1.6, 1.8, or 2.0 parts of surfactant per thousand parts of first cleaning liquid (this unit of concentration being freely applied hereinafter to any constituent of any total composition and being hereinafter usually abbreviated as "ppt") and independently preferably, at least for economy, is not more than, with increasing preference in the order given, 8, 6, 5.0, 4.0, 3.5, 3.0, or 2.5 ppt.

Normally, the presence of a preservative in a first cleaning liquid as described above is highly preferred if the first cleaning liquid is to be stored in an open container during its use as it often is, because some commonly air-borne micro-organisms with malodorous and/or otherwise disagreeable metabolic products are readily attracted to and nourished by some of the constituents of the first cleaning liquid. Any preservative with sufficient protective value against ambient micro-organisms may be used, provided that it does not adversely affect the first cleaning liquid properties as described above. Preservatives containing isothiazolin-3-one moieties, more particularly a mixture of the commercial products KATHON™ 886 MW and 893 MW preservatives from Rohm and Haas Co., have been found particularly satisfactory. KATHON™ 886 MW is reported by its supplier to contain 10–12% of 5-chloro-2-methyl-isothiazolin-3-one and 3–5% of 2-methyl-isothiazolin-3-one as its preservative active ingredients along with 14–18% of magnesium nitrate and 8–10% of magnesium chloride, all in water solution with water as the balance. KATHON™ 893 MW is reported by its supplier to contain 45-48% of 2-n-octyl-4-isothiazolin-3-one and 52–55% of propylene glycol. A first cleaning liquid in a process according to the invention preferably contains these two commercial materials with twice as much of 886 as of 893 and independently preferably contains, independently for each material noted, at least, with increasing preference in the order given: 0.50, 0.75, 0.90, 1.00, 1.10, 1.20, 1.30, or 1.37 parts per million by weight of the total first cleaning liquid, hereinafter usually abbreviated as "ppm", of 5-chloro-2-methyl-isothiazolin-3-one; 0.10, 0.20, 0.25, 0.30, 0.35, 0.40, 0.45, or 0.48 ppm of 2-methyl-isothiazolin-3-one; and 0.75, 1.00, 1.50, 2.00, 2.25, 2.45, 2.60, 2.75, or 2.90 ppm of 2-n-octyl-isothiazolin-3-one. Also, independently of other preferences and independently for each material noted, a composition to be used as a first cleaning liquid in a process according to the invention preferably contains not more than, with increasing preference in the order given: 10, 8, 6, 4.0, 3.0, 2.5, 2.0, or 1.5 ppm of 5-chloro-2-methyl-isothiazolin-3-one; 5, 3, 2.0, 1.5, 1.0, 0.8, 0.6, or 0.54 ppm of 2-methyl-isothiazolin-3-one; and 25, 15, 10, 8, 6, 5.0, 4.0, 3.7, 3.4, 3.2, or 3.0 ppm of 2-n-octyl-isothiazolin-3-one, all of the preferences stated in this sentence being primarily for economy.

Additional optional ingredients may be present in a first cleaning liquid as described above. For economy, a solid, usually finely divided, "space filler" may be advantageously included, although too much of such an ingredient will often cause the solid formed from the first cleaning liquid to be too brittle and/or poorly adherent for optimal functioning of a process according to the invention. When desired, such materials can be selected from those known per se in the art as fillers, such as clays, glass and plastic microballoons, diatomaceous earth, nut shell flour, wheat protein hydrolyzate, calcium carbonate, and the like. Other solid additives such as soluble chitosan, natural gums, cellulose and chemically modified cellulose, and the like can actually improve or supplement the film forming properties of the essential solid-forming ingredient(s) of the first cleaning liquid. Dyes or other colorants may be included to assist users in visually estimating the thickness of the coating formed, serve as an indicator of source, or the like.

If the second cleaning liquid is aqueous based and has a pH value of 7.0 or higher, the essential solid forming substance in a first cleaning liquid preferably is a polymer of monomers selected from the group consisting of acrylic and methacrylic acids and the salts, esters, amides, and nitriles of acrylic and methacrylic acids. More preferably, this polymer, in solid form, is readily soluble in said second cleaning liquid. Other characteristics of the first cleaning solutions are the same as those described above for the first cleaning solution when an acidic aqueous second cleaning liquid is used.

The adequacy of any cleaning process in removing fine particles will ultimately be determined by acceptance for a particular application, and the difference between a possibly adequate and a totally inadequate cleaning process can be readily detected by simple visual examination. As already noted above, however, in some instances simple visual examination immediately after the cleaning stage is not sufficiently discriminating to assure satisfaction in later applications, and the difference if any between two possibly adequate cleaning processes can not always be determined by simple visual examination. In order to guide the development work that led to the embodiments of the invention already described above, it was therefore considered necessary to develop also a method for quantifying the extent of removal of fine particles that was more sensitive than simple visual examination. Accordingly, another embodiment of the invention is a process of quantifying the extent of removal, by a particular tested cleaning process operation or tested group of process operations, of fine particles from a hard surface that has been cleaned by a cleaning process including said tested cleaning process operation or tested group of operations. (The cleaning process optionally may include other operations for which the cleaning effect does not need to be tested.)

It has been found that one of the most important parts of such a quantifying process is the preparation of surfaces bearing a controlled and reproducible amount of fine particle soil that (i) is reasonably representative of the particle size, chemical nature, and tenacity of adherence of fine particle soil to be removed in a practical cleaning operation and (ii) facilitates a quantitative measure of its amount on a hard surface. It was found that the latter quality was satisfactorily achieved by utilizing soil that reflected light to a substantially different extent than did the hard surface from which the soil was to be removed. This permits the extent of removal of the soil to be determined quantitatively by measuring the reflectivity of the surface under consistent illumination conditions before and after cleaning. Differences are most readily detected if the soil is more reflective than the hard surface from which it is being removed, but using soil substantially less reflective than the hard surface is also possible. The greater the difference in reflectivity between the soil and the hard surface, the more sensitive the measurement of cleaning effectiveness can be.

After considerable experimentation with various particle sizes, it was found that the swarf produced by sanding gray-to-white plastic sheet molding compound with 120 grit closed coat aluminum oxide coated abrasive cloth belts on a power belt sander appeared most closely to match the particle sizes most troublesome to remove from plastic and painted surfaces by prior art processes. Fine particles of this size, which appear almost white in color even when obtained from gray plastic, were most preferably used together with hard surfaces of matte or glossy black plastic. Digital photography was found to be particularly useful in quantitatively determining brightness of surfaces, because the digital photographs can be analyzed in great detail by various readily available computer programs for photographic manipulation and quantification.

After having selected the size and type of particles, there still remains the question of attaching them to the hard surface in a reliable and consistent manner that will be reasonably comparable to the degree of attachment of fine particle soil from more practical sources. It was found that moderately effective results could be achieved by suspending the particles in a volatile liquid such as isopropyl alcohol or water, applying this suspension to the surface, and allowing the wet suspension layer on the surface to dry. However, it was eventually determined that more consistent results could be achieved by spreading an approximate "monolayer" of the dry fine particles on the hard surface by a sifting or "salting" (as from a salt shaker) type process and then dropping discrete drops of partially volatile liquid containing a small amount of non-volatile solute, which is solid when separated from the volatile contents of the partially volatile liquid, gently onto the monolayer of fine particles.

When the volume of dry fine particles per unit area of the surface, the chemical nature of the partly volatile liquid, the size of the liquid drops, and the height from which the drops fall are all satisfactory, each liquid drop falls onto the particle covered surface and remains where it falls as the volatile content of the liquid begins to evaporate. (If the amount of powder is too large, the liquid drops will usually roll away from the surface, as water does from a hand liberally dusted with talcum powder.) At least some of the fine particles in the vicinity of the drop initially spread over its outer surface as a sort of crust. As the volatile part of the partially volatile liquid evaporates, the particles in this crust, and possibly other particles that remained under the liquid drop, become adhered to the surface by the non-volatile solute in the partially volatile liquid. These adhered particles have the shape of a generally circular disk with a central "hole" of quite irregular shape and extent. The outer parts of the disk, however, are mostly reasonably uniform in brightness as judged visually. Tap water was eventually found to be a fully satisfactory partially volatile liquid for this purpose.

After whatever liquid used to promote adherence has been volatilized, any remaining loose fine particles are removed by blowing gently with compressed air or other compressed gas, or even by gentle brushing with a soft bristled brush, the former being preferred; any physical contact between the adhered particles and a solid or liquid substance can easily damage the desired uniformity of the disk of adhered particles. When many such disks, each separated from any other by a sufficient distance that the disks of adhered particles do not overlap, had been formed on a single piece of hard plastic surface, it was found that the overall reflectance of each ring was consistent within statistically significant ranges, as further specified in detail below.

In more formal terms, a preferred process according to this invention for quantifying the effectiveness, for cleaning fine particles from surfaces, of a cleaning process comprises quantifying operations of:

(I') selecting a hard surface and a collection of fine particles to be tested, the fine particles being reflective of light to a consistently different degree than is said hard surface;

(II') providing a digital camera having a known pixel size and capable of quantitatively measuring the brightness level of each pixel within the entire image formed by the camera and/or within a selected portion thereof defined by a marquee perimeter; and (III') adhering a plurality of groups of fine particles from said collection of fine particles to said hard surface, each of said groups having both of the following properties:

the adhered group covers an area of the hard surface that is at least 1.0 square millimeter in extent and is also large enough to include at least 4000 pixels of said known size; and the adhered group is surrounded on all its perimeter by a zone of the hard surface that is at least, with increasing preference in the order given, 0.5, 1.0, 2.0, 3.0, 4.0, or 5.0 millimeters in width and is free of any adhered fine particles from said collection of fine particles, said plurality being sufficiently large and the individual adhered groups of fine particles within the plurality being sufficiently nearly uniform in area and brightness that, when:

each adhered group of said collection is photographed in its entirety, but exclusive of any part of any other distinct adhered group, under selected constant conditions of lighting with said digital camera to generate a digital photograph of said adhered group; and the brightness of each pixel within the digital photograph so made for each adhered group of said collection is quantitatively measured from the digital photograph, the plurality contains at least two distinct mutually exclusive collections of said adhered groups of fine particles, each of said collections conforming to at least one of the following sets (3.1) and (3.2) of conditions:

(3.1) when:
the thus determined individual brightness values of said pixels within said digital photograph are measured and analyzed by a consistent statistical technique that provides a representative value of brightness for said digital photograph of each adhered group within the collection; and a collection average value of the thus determined representative values of brightness for each said digital photograph of each individual group within said collection and a standard deviation of the individual representative values from said collection average value are determined, then:
said standard deviation for any individual collection is not greater than, with increasing preference in the order given, 40, 30, 25, 20, 15, 10, or 5% of said average value; and no collection average value differs from any other collection average value for another collection within said at least two collections by an increment that is more than, with increasing preference in the order given, 30, 25, 20, 15, 10, or 5% of an average value of the two collection average values for the two said collections;

(3.2) (3.2.1) each adhered group within said collection comprises within its area at least three distinct, continuous, non-overlapping zones, each of said zones having an area that is:

the same for each such zone; and is large enough to include at least 1000 pixels of said known size;

(3.2.2) when:
a brightness value for each pixel within one of said distinct, continuous, non-overlapping zones within each group is measured;

the smallest pixel brightness value thus measured is subtracted from the highest pixel brightness value thus measured to define a brightness range for the zone;

a brightness unit interval is selected for the zone, said brightness unit interval having the properties that the brightness range is an integral multiple of the brightness unit interval and the quotient of the brightness range divided by the brightness unit interval has a value n that is at least, with increasing preference in the order given, 10, 20, 30, 40, or 50; and there is prepared a two row table in which:
there are n cells in each row;

each cell in the upper row contains an upper and a lower brightness boundary;

the lower brightness boundary of the leftmost cell in the upper row is equal to the smallest brightness value for any pixel within the zone;

for each positive integer i that is not greater than n, the upper brightness value of the $i$'th cell from the left of the upper row is equal to the sum of the smallest brightness value for any pixel within the zone plus the product of i and the brightness unit interval, for each value of i from 1 to n;

the lower brightness boundary of any cell of the upper row except the leftmost cell is equal to the upper brightness boundary of the cell next to the left in the upper row;

each cell, except the rightmost cell, of the bottom row of the two row table contains the integral number of pixels within said zone for which the brightness is at least as great as the lower brightness boundary in the cell immediately above it in the table but not as great as the upper brightness boundary value in the cell immediately above it in the table; and the rightmost cell of the bottom row of the two row table contains the integral number of pixels within said zone for which the brightness is at least as great as the lower brightness boundary in the cell immediately above it in the table but not greater than the upper brightness boundary value in the cell immediately above it in the table, then the lower row of the two row table will contain at least one cell, denoted hereinafter as the "maximal cell", having the properties that:

every cell in the bottom row of the two row table that is to the left of the maximal cell contains a number that is not greater than the number in its right adjacent neighbor cell; and every cell in the bottom row of the two row table that is to the right of the maximal cell contains a number that is not greater than the number in its left adjacent neighbor cell;

(3.2.3) the digital photograph of each group contains a portion, herein-after designated the "representative average brightness portion", that can be demarcated from the remainder of the photograph by normal unaided human vision after the digital photograph has been embodied in a visible form, said representative average brightness portion having the properties that:

it has an area that is sufficiently large to contain at least three of said distinct, continuous, non-overlapping zones; and if any three distinct, continuous, non-overlapping zones that all lie entirely within said representative brightness portion and that all satisfy the criteria of part (3.2.2) of this description above are selected and the mean values of the pixel brightness values for each zone are measured and averaged, the standard deviation of the individual mean values for each of the three zones will not differ from the average value of these mean values for the three zones by more than, with increasing preference in the order given, 50, 40, 30, 20, 1 0, or 5% of the average value; and, optionally, (3.2.4) the digital photograph of each group contains a portion, herein-after designated the "maximum brightness portion", that can be demarcated from the remainder of the photograph by normal unaided human vision after the digital photograph has been embodied in a visible form, said representative average brightness portion having the properties that:

it has an area that is sufficiently large to contain at least one of said distinct, continuous, non-overlapping zones; and at least one said zone that lies entirely within said maximum brightness portion satisfies the criteria of part (3.2.2) of this description above and the pixels of said zone that satisfies the criteria of part (3.2.2) above have a mean brightness value that is not less than the mean value of brightness for the pixels of any other zone, within the digital photograph of the entire adhered group, that satisfies the criteria of part (3.2.2) above and lies entirely outside the boundary of said maximum brightness portion;

(IV') defining a representative overall value of brightness of each of said at least two collections of groups of adhered fine particles by one of the following sequences of operations (4.1) and (4.2), sequence (4.1) being used only if condition set (3.1) as recited above was satisfied for the collection and sequence (4.2) being used only if condition set (3.2) as recited above was satisfied for the collection;

(4.1) (4.1.1) photographing each adhered group of said collection in its entirety while excluding any part of any other distinct adhered group, under the selected constant conditions of lighting used when testing the group as recited in operation (III'), with said digital camera to generate a digital photograph of said adhered group;

(4.1.2) quantitatively measuring the brightness of each pixel within each digital photograph so made;

(4.1.3) measuring and analyzing the thus determined individual brightness values of said pixels for each digital photograph by the statistical technique that was used for testing as recited in condition set (3.1) above to provide a representative value of brightness for the pixels of said digital photograph; and (4.1.4) calculating a collection average value of the thus determined representative values of brightness for the pixels of each said digital photograph of an individual group within said collection and a standard deviation of the individual representative values from said collection average value and denoting said collection average value as said representative overall value for the collection;

(4.2) (4.2.1) photographing each adhered group of said collection in its entirety while excluding any part of any other distinct adhered group, under the selected constant conditions of lighting used when testing the group as recited in operation (III'), with said digital camera to generate a digital photograph of said adhered group;

(4.2.2) demarcating a representative average brightness portion for said digital photograph of each adhered group, and, optionally, also demarcating a distinct maximum brightness portion for said digital photograph;

(4.2.3) selecting within said representative average brightness area an integral number, said number being at least two and being the same for each zone, of distinct, continuous, non-overlapping zones that satisfy all of the criteria recited for such zones in part (3.2) above, and, optionally if a distinct maximum brightness portion of the digital photograph has been demarcated in operation (4.2.2), also selecting within said maximum brightness portion an integral number, said number being the same for each zone, of distinct, continuous, non-overlapping zones that satisfy all of the criteria recited for such zones in part (3.2) above;

(4.2.4) determining the mean pixel brightness separately for each zone selected in operation (4.2.3);

(4.2.5) calculating, for each digital photograph of a single adhered group within the collection, an average value of the brightness for each zone within the group as determined in operation (4.2.4); and (4.2.6) calculating, and denoting as said representative overall value for the collection, the average value for the collection of the group average values determined in operation (4.2.5);

(V') applying said cleaning process including said tested cleaning process operation or tested group of operations to every group of adhered fine particles within at least one of said at least two collections of groups of adhered fine particles, while applying to at least one other collection of said at least two collections only any operation or operations that are part of said cleaning process but are not part of said tested cleaning process operation or tested group of operations;

(VI') defining a representative overall value of brightness for a collection of areas of said hard surface that were occupied before operation (V') by the groups of adhered fine particles of the at least one collection of such groups to which the cleaning process including the tested process operation or tested group of operations was applied in operation (V') and separately defining a representative overall value of brightness for a collection of areas of said hard surface that were occupied before operation (V') by the groups of adhered fine particles of the at least one collection of such groups to which a cleaning process including the tested process operation or tested group of operations was not applied in operation (V'), said defining of a representative overall value of brightness for both said collections of areas being made by one of the sequences of operations (4.1) and (4.2) as described above, except that areas formerly occupied by groups of adhered fine particles are substituted in the detailed descriptions of operations (4.1) and (4.2) for the groups of adhered fine particles themselves, sequence (4.1) being used only if condition set (3.1) as recited above was satisfied for the collection before operation (V') and sequence (4.2) being used only if condition set (3.2) was satisfied for the collection before operation (V''); and (VII') defining the difference between the representative overall value of brightness of the collection of areas formerly occupied by groups of adhered fine particles to which a cleaning process including the test cleaning operation or tested group of operations was applied, as determined in operation (VI'), and the representative overall value of brightness of the collection of areas formerly occupied by groups of adhered fine particles to which a cleaning process including the test cleaning operation or tested group of operations was not applied, as determined in operation (VI'), to be said quantifying the effectiveness, for cleaning fine particles from surfaces, of the tested process operations or tested group of operations.

It is to be understood in connection with the description of preferred quantifying operations immediately above and elsewhere herein that:

any operation defined in mathematical terms, including the making of tables with cells having contents specified in mathematical terms, can be and usually preferably is performed virtually within a suitably programmed computer as well as by human activity, with only the final result needed for human decision making being necessarily output by the computer;

operations or comparisons defined in mathematical terms that in abstract mathematical principle require an infinite number of comparisons or iterations are in practice to be performed with a sufficient number of comparisons or iterations to give a statistical confidence level of at least, with increasing preference in the order given, 60, 75, 80, 85, 90, or 95% that the standard deviation limits achieved for the finite data actually tested are representative of the infinite data of the same type potentially determinable;

the parts of the description above with the arbitrary identifier "(3.2.2)", such parts including the entire text between the first occurrence of this identifier and the arbitrary identifier "(3.2.3)" are a detailed description of what is meant by stating that the individual pixel brightnesses of the pixels within each said distinct, continuous, non-overlapping zone have a "monomodal histogram", which term may be used hereinafter in lieu of the parts of the text with the arbitrary identifier (3.2.2);

the analysis technique that tests conformity to the set of conditions specified with the arbitrary identifier (3.1), these conditions including all of the text between the first occurrence of the arbitrary identifier (3.1) and the first occurrence of the arbitrary identifier (3.2), may be designated hereinafter as the "full group analysis method"; and the analysis technique that tests conformity to the set of conditions specified between the first occurrence of the arbitrary identifier (3.2) and the first occurrence of the arbitrary identifier (IV') may be designated hereinafter as the "zone analysis method".

Contrary to what might naively be expected, for reasons discussed further in the description of examples below, the preferred "consistent statistical technique" required for the full group analysis method does not involve any use of the average brightness value within a digital photograph of an entire adhered spot, when the fine particles are more reflective than the background hard surface. Instead, the statistical technique concentrates on the brightest pixels only. A moderately preferred technique more explicitly relies on the average or total brightness of only those pixels that exceed a "threshold brightness value" that is selected so as to include a number of pixels that preferably is at least, with increasing preference in the order given, 10, 15, 20, 25, 30, or 33% of the total number of pixels in the digital photograph and independently preferably is not more than, with increasing preference in the order given, 75, 65, 55, 50, 45, 40, 37, or 34% of the total number of pixels. Still more preferably, this value for the brightest percentage of the pixels is "corrected" by deducting from it the average or total brightness of the pixels with an individual brightness that exceeds an "upper limit value" that is selected so that the number of pixels that exceed this upper limit value is at least, with increasing preference in the order given, 1.0, 2.0, 3.0, 4.0, 4.5, or 4.9% of the total number of pixels and independently preferably is not more than, with increasing preference in the order given, 9.5, 9.0, 8.0, 7.0, 6.0, or 5.1% of the total number of pixels.

Some preferences for a cleaning quantifying process according to the invention have been given above, and some still more preferred details of such processes are described below as part of the examples.

This invention may be further appreciated from consideration of the following examples and comparison examples.

Preparation of Test Specimens for Testing Effectiveness of Particle Removal

The test specimens were made from plaques of in-mold-coated sheet molding compound having major surfaces that were planar and uniformly coated with a black coating having a gloss meter reading of 75 at 60° angle reflection, although the sheet molding compound itself was white. Simulated contaminant dust was obtained by sanding the edges (not the major surfaces) of sheet molding compound plaques. This simulated contaminant dust was spread over the black planar surface of a test plaque to form a uniform dry layer. Spots of adherent dust were then formed by dropping a single drop of tap water from a syringe or other drop-forming container maintained at a fixed height over the dry layer of simulated contaminant dust to begin to create each spot. The spots were spaced sufficiently far apart that no water from any one spot site contacted the water from any other spot site. The spot sites were arranged in regular rows to facilitate coating multiple spots with a single first cleaning liquid as described above, and some area of the uniform dry layer of simulated contaminant dust on each plaque was left unspotted to serve as a control for the measurements to be made later. Once the desired spot pattern had been formed on a particular plaque, the plaque was put aside and allowed to dry while the spotted surface remained facing directly up. After all of the water applied to form spots had completely dried, a flow of compressed air was directed against the spotted surface until all loose dust that could be detected with normal unaided human vision was blown away, leaving the spots of adhered dust in place.

Application of First Cleaning Liquids

A test plaque having on its surface (i) a control group of at least 6 spots, adhered as described above, that were not disturbed during the application of cleaning liquids and, on the same surface, (ii) a distinct group of at least 6 such adhered spots for each candidate first cleaning liquid to be tested on that particular plaque was selected and marked appropriately, so that the treatment if any of each group of spots was known, was selected for the test. Each first cleaning liquid to be tested was applied dropwise on the surface of and around each spot of the test group for each candidate first cleaning liquid, without making any physical contact between any solid surface and the spots or any other part of the plaque surface being tested, while the plaque surface being tested was maintained horizontal, until all of the spots in the intended test group and a zone at least 0.5 millimeters (hereinafter usually abbreviated as "mm") in width around each such spot was completely wetted. The tested surface was then tilted so that the first test liquid could drain away without making any contact with any of the attached spots on the surface that were not part of its own test group. A substantial angle of tilt was maintained until the entire part of the test plaque surface that had been wet with the candidate first cleaning liquid had dried, a process that should require no more than 10 minutes and was aided if needed by absorbing liquid from the dripping edge of the test plaque.

Use of a Second Cleaning Liquid and Subsequent Processing

In all of the specific examples reported herein, the following four operations were applied to dried test plaques coated with solid coatings formed from candidate first cleaning liquids as described in the immediately preceding paragraph, or on other surfaces for comparison:

1. Power wash with an acidic cleaner (the "second cleaning liquid" as described above) made by mixing PARCO® Plastic Cleaner 2501 concentrate with tap water to form a solution containing 2.0% of the concentrate, the resulting acidic cleaner being maintained during use at a temperature of 57° C. and being sprayed for a time interval of 60 seconds (hereinafter usually abbreviated as "sec").
2. Spray rinse with tap water at ambient temperature for 30 sec.
3. Spray rinse with deionized water at ambient temperature for 30 sec.
4. Blow compressed air on the surface until it is dry.

Quantitative Determination of the Amount of Dust on a Test Plaque

A surface of a test plaque on which there were some adhered dust spots as described above, or a comparison surface, was digitally photographed (in either black-and-white only or color, with no effect on the results), before or after a test cleaning, through a type of microscope commonly known as a "dissecting microscope", which can be set to have a magnification from about 5 to about 150 power. The degree of magnification of a visible photograph made from the original digital photographic data was normally between 5 and 30 power, and there was no evidence that the results obtained varied with the degree of magnification within this range. There was a distance of 50 to 80 mm between the closest part of the microscope lens and the surface being photographed. Two collimated light sources were arranged so that a light beam from each of them illuminated the same part of the test plaque surface to be photographed. There was an angle of about 90 degrees between the central axes of the two collimated light beams and an angle of about 45° between the central axis of each light beam and the plane of the surface of the test plaque being photographed. There were also distances of about 25 mm between the nearest part of each collimated light beam and the plane of the surface of the test plaque being photographed and a distance of about 25 mm between the nearest parts of the two collimated light beams at the level farthest above the test plaque being photographed where the light beams emerge from their sources. The intensity of light from the collimated light sources was kept constant for a series of photographs to be compared. The central axes of the two collimated light sources and the axis of the microscope optics all were in a single plane, and the plane of the surface of the test plaque intersected this plane containing the three axes at a (smaller) angle of 80 to 85°, a perpendicular intersection between these two planes being deliberately avoided in order to minimize any effect of unavoidable random surface scratches on the plane test plaque surface in obscuring the difference in brightness due to differing extents of residual simulated contaminant dust on the same surface.

Each of the originally deliberately adhered dust spots was photographed as a separate image and analyzed for total brightness with the aid of an ADOBE™ PHOTOSHOP™ Version 4.0.1 computer software package. After experimentation with various possible settings and conditions, it was found that adequate reproducibility and correlation with an overall evaluation supplied by visual estimation could be achieved by either of two distinct techniques of digital analysis. The first and more preferred of these consisted of the following operations:

utilizing a circular marquee with a diameter of 64 pixels as the area of the photograph sampled; and for each adhered spot analyzed;

determining the brightness levels for each pixel within three such marquees within three distinct areas of the photograph of the spot that appeared by visual examination to be most nearly uniform and representative for the spot, care being taken in particular to avoid including within any of these three marquees any of the irregular and readily visually obvious darker area or areas within the vicinity of the center of the spot;

also determining the brightness level for each pixel within three marquees located close on the test plaque to the residue of the adhered spot but outside it, one of these three marquees outside the residues being selected so each of the three marquees noted above within a representative area of the spot was paired with one marquee outside the spot but as close to the marquee within the spot as was reasonably possible within this constraint;

determining the mean brightness of pixels within each of these six marquees separately;

averaging the mean brightness of the three marquees within the representative parts of the spot residue and separately averaging the mean brightness of the three marquees close to but outside the area of adhered dust for the spot being analyzed, and subtracting the second of these averages from the first to yield the "net brightness" due to the presence of dust particles still present.

At least six spots analyzed in this way were evaluated for each washing variation or comparison evaluated.

In the second method, no marquee was used, and the area of an entire spot or spot residue was analyzed pixel-by-pixel in a single digital image. The net brightness in this method was determined by subtracting the brightness of the brightest 5% of the pixels corresponding to each spot from the brightness of the brightest one-third of the pixels corresponding to each spot. (It is believed that this method works well at least in part because the very brightest spots in visual examination usually proved to result from larger scale particle contamination of the surfaces that could not be avoided, while even the brightest residual particles of deliberated adhered dust were almost never as bright as this.)

In either of these methods, the data on individual spots are inherently variable, but by the use of unwashed control spots and replicate spots for each condition tested, statistically reliable reproducibility was obtained.

Evaluation of Specific First Cleaning Liquids

Four candidate first cleaning liquids containing only one essential solid-forming substance were prepared from the ingredients shown in Table 1 below. In this table, "PVP" means PVP K-30 poly(vinyl pyrrolidone), a commercial solid powder product of GAF Corp., with other composition information proprietary; "PVA" means AIRVOL™ 540 "polyvinyl alcohol", a commercial product of Air Products, which is reported by its supplier to be 87–89% hydrolyzed poly(vinyl acetate) with a weight average molecular weight of $1.2 \times 10^5$ to $1.8 \times 10^5$; "GEL" means Peter Cooper™ 92B gelatin hydrolyzate; "SNY" means

TABLE 1

| | Grams of Ingredient per Kilogram of Total Composition in: | | | |
|---|---|---|---|---|
| Ingredient | S1 | S2 | S3 | S4 |
| PVP | 50 | None | None | None |
| PVA | None | 50 | None | None |
| SNY | None | None | 50* | None |
| GEL | None | None | None | 50 |
| KJ-2 | 5.0 | 5.0 | 5.0 | 5.0 |
| 886 | Approximately 0.10 gram in each of S1 to S4 | | | |
| 893 | Approximately 0.05 gram in each of S1 to S4 | | | |
| Water | Balance to 1.00 kilogram for each of S1 to S4 | | | |

*This composition also contained 1.5 grams of 98% $H_2SO_4$ to facilitate the dissolution of the SNY.

Toray™ AQ Nylon A-90; "KJ-2" means AMPHOTERGE™ KJ-2; "886" means KATHON 886MW preservative; and "893" means KATHON™ 893MW preservative. Ten candidate first cleaning liquids, as shown in Table 2 below, were then made from compositions S1 to S4 as described in Table 1.

TABLE 2

| Candidate First Cleaning Liquid | Percent in This Candidate First Cleaning Liquid of Composition: | | | |
|---|---|---|---|---|
| Identifier | S1 | S2 | S3 | S4 |
| CFCL-1 | 100 | 0 | 0 | 0 |
| CFCL-2 | 0 | 100 | 0 | 0 |
| CFCL-3 | 0 | 0 | 100 | 0 |
| CFCL-4 | 0 | 0 | 0 | 100 |
| CFCL-5 | 50 | 50 | 0 | 0 |
| CFCL-6 | 50 | 0 | 50 | 0 |
| CFCL-7 | 50 | 0 | 0 | 50 |
| CFCL-8 | 0 | 50 | 50 | 0 |
| CFCL-9 | 0 | 50 | 0 | 50 |
| CFCL-10 | 0 | 0 | 50 | 50 |

The net brightness after washing with each of these candidate first cleaning liquids was determined by the full group analysis technique described above (i.e., brightest one-third of pixels minus brightest 5% of pixels). The results, including means and values for plus and minus one standard deviation from the mean, are shown in Table 3 below. In this table, "SDM" means "standard deviation from the mean".

TABLE 3

| CFCL Number from Table 2 | Net Brightness (in Arbitrary Units) after Washing with This CFCL | | |
|---|---|---|---|
| | Mean − 1 SDM | Mean | Mean + 1 SDM |
| Control (No Washing) | The entire range for the controls was 23 to 33 | | |
| 1 | 23 | 25 | 27 |
| 1 (Replicate) | 23 | 25 | 27 |
| 2 | 3.5 | 4.5 | 5.6 |
| 2 (Replicate) | 3.3 | 4.4 | 5.5 |
| 3 | 0.0 | 0.5 | 1.0 |
| 3 (Replicate) | 0.0 | 0.4 | 0.8 |
| 4 | 18.8 | 23.2 | 27.5 |
| 4 (Replicate) | 18.8 | 23.2 | 27.5 |
| 5 | 0.8 | 1.8 | 2.8 |
| 6 | 8.3 | 12.0 | 15.7 |
| 7 | 27.5 | 28.8 | 30.0 |
| 8 | 0.0 | 0.5 | 1.0 |
| 9 | 3.0 | 3.5 | 4.0 |
| 10 | 20.2 | 21.2 | 22.2 |

The results in Table 3 indicate that soluble nylon was the most effective essential solid former for a first cleaning liquid as described above when used alone, and partially hydrolyzed poly(vinyl acetate) was also quite effective alone, while poly(vinyl pyrrolidone) and gelatin hydrolyzate appeared to have a slight value but could not be statistically certain to be better than the use of no solid former at all. Mixtures with designating numbers CFCL-5, -8, and -9 were also quite effective, while among the other mixtures only CFCL-6 could be clearly distinguished from no washing at all, and CFCL-6 was much less effective than any of CFCL-2, -3, -5, -8, and -9. All of the more effective half of the ten candidate first cleaning liquids contained at least 50% of partially hydrolyzed poly(vinyl acetate) or soluble nylon, which suggests that these two substances are likely to be the best. Soluble nylon, however, is uncertain in continued availabilty, is expected to be considerably more expensive than partially hydrolyzed poly(vinyl acetate), and is more susceptible to difficulties in preparation of the solutions. For these practical reasons, partially hydrolyzed poly(vinyl acetate) was tentatively most preferred.

It was observed, however, that all of the candidate first cleaning liquids described in detail in Table 2 that contained partially hydrolyzed poly(vinyl acetate) were considerably more viscous than any of the other candidate first cleaning liquids in the table. It was therefore deemed prudent to test lower concentrations of partially hydrolyzed poly(vinyl acetate) in order to make sure that its high viscosity was not the determining factor in its good performance as shown in Table 3.

Accordingly, a "diluent" concentrate was prepared with the same ingredients as S2 table 1, except that the partially hydrolyzed poly(vinyl acetate) ingredient was omitted altogether (and the amount of water correspondingly increased). The SDM composition was then mixed with the S2 composition to prepare five additional candidate first cleaning liquids that contained 80, 60, 40, 20, or 0% of the concentration of partially hydrolyzed poly(vinyl acetate) that was present in composition S2 but otherwise had the same ingredients. The viscosities of these five candidate first cleaning liquids and of CFCL-1 through -4 from Table 2 were then measured with a #2 Zahn cup at 25° C. (If desired, the efflux time ("$t_e$") in seconds from this device can be converted to centistokes viscosity ("V") by use of the equation $V=4.18t_e-(760/t_e)$, and the centistokes viscosity thus obtained can be converted to centipoises viscosity by multiplying the centistokes viscosity by the specific gravity of the liquid being tested for viscosity.) The results are shown in Table 4 below.

TABLE 4

| CFCL Number (with Hyphen) or % PVA | -1 | -2 | -3 | -4 | 80 | 60 | 40 | 20 | 0 |
|---|---|---|---|---|---|---|---|---|---|
| Efflux Seconds from #2 Zahn Cup | 16 | 31 | 16 | 15 | 22 | 18 | 17 | 16 | 15 |

It is apparent from the values in Table 4 that the viscosity of the CFCL-2 composition can be substantially reduced by lowering the concentration of partially hydrolyzed poly(vinyl acetate) in it.

The cleaning effectiveness of these candidate first cleaning liquids with lower concentrations of partially hydrolyzed poly(vinyl acetate) as their essential solid-forming substance was then evaluated in the same manner as described above for CFCL-1 to -10, except that the digital photographs were analyzed by the zone analysis technique described above (i.e., using 64 pixel diameter circular marquee samples rather than the entire spot) and the results are shown in Table 5 below. These results indicate that at least 40–80% of the concentrations of partially hydrolyzed poly(vinyl acetate) present in CFCL-2 gives about as good cleaning effectiveness as CFCL-2 itself, and even 20% of the concentration of CFCL-2 may be enough to fall within the same class. Combined with the results of Table 4, these results indicate that the high viscosity of CFCL-2 is not necessary for its good cleaning effectiveness.

TABLE 5

| Concentration of PVA as Percent of Value for CFCL-2 | Net Whiteness Value after Washing with This Candidate First Cleaning Liquid (Arbitrary Units) | |
|---|---|---|
| | Mean | Standard Deviation |
| 0 | 61 | 5 |
| 20 | 32 | 7 |
| 40 | 26 | 5 |
| 60 | 23 | 2 |
| 80 | 30 | 7 |
| 100 | 26 | 4 |
| No Washing Control | 81 | 20 |

Processes with Alkaline Wash Liquids

A first cleaning liquid for use as described above with an alkaline second cleaning liquid was prepared. It contained 75 ppt of CARBOSET™ 527 acrylic polymer, a powdered solid commercial product of B.F. Goodrich, with other composition information maintained as a trade secret, 10 ppt of NaOH, and 20 ppt of AMPHOTERGE™ KJ-2 surfactant as already described above, with the balance water. The material is used as a first cleaning liquid in the manner described above for composition CFCL-1 through 10, except that the second cleaning liquid is aqueous sodium hydroxide solution with a pH value of 8.0, 8.5, 9.0, 10.0, 11.0, or 12.0. Excellent removal of both the solid film formed by the first cleaning liquid and adhered dust, as estimated visually without any attempt at quantification, is obtained with all of these concentrations of sodium hydroxide. Any of a large number of commercially available built alkaline cleaner solutions having a pH value corresponding to one of those tested with simple sodium hydroxide solution can be reliably expected to remove the solid film as well as do the simple sodium hydroxide solutions.

The invention claimed is:

1. A process for cleaning a solid surface, said process comprising the following operations:
   (a) forming over the solid surface to be cleaned a liquid coating of a first cleaning liquid that has both of the following properties:
      the entire first cleaning liquid is a homogeneous liquid when the first cleaning liquid is applied to the solid surface to be cleaned to form said liquid coating thereover; and
      at least a portion of the first cleaning liquid can be transformed to a continuous coherent solid by a solidification process that does not damage the solid surface to be cleaned;
   (b) applying to the liquid coating of the first cleaning liquid formed in operation (a) said solidification process, such that said liquid coating is converted to a solid coating; and
   (c) removing the solid coating that was formed in operation (b) by contacting said solid coating with a second aqueous liquid having a pH value of between 1.0 and 6.1 that dissolves, disperses, or both dissolves and disperses the solid coating during the time of said contacting;

wherein in said first cleaning liquid:
  there is a component of dissolved solid selected from the group consisting of at least partially hydrolyzed poly (vinyl acetate), soluble nylon, poly(vinyl pyrrolidone), and gelatin hydrolyzate; and
  there is a concentration of at least about 0.8 ppt of a surfactant component of molecules selected from the group consisting of substances that have in each molecule:
    an imidazoline moiety; and
    a hydrophobe moiety that satisfies all of the following conditions:
      it is attached to the carbon atom in said imidazoline moiety that is directly bonded to both nitrogen atoms;
      it has at least 8 carbon atoms;
      it contains no atoms other than carbon, hydrogen, nitrogen, oxygen, phosphorus, sulfur, and halogens; and
      if it contains any atoms of nitrogen, oxygen, phosphorus, or sulfur, it contains such atoms in a number having a ratio to the number of carbon atoms in said hydrophobe moiety that is not more than about 0.34:1.0.

2. A process according to claim 1 wherein said solid surface is comprised of plastic.

3. A process according to claim 1 additionally comprising a preservative.

4. A process according to claim 3 wherein the preservative is selected from the group consisting of 5-chloro-2-methyl-isothiazolin-3-one, 2-methyl-isothiazolin-3-one, 2-n-octyl-4-isothiazolin-3-one, and mixtures thereof.

5. A process for cleaning a solid surface, said process comprising the following operations:
  (a) forming over the solid surface to be cleaned a liquid coating of a first cleaning liquid that has both of the following properties:
    the entire first cleaning liquid is a homogeneous liquid when the first cleaning liquid is applied to the solid surface to be cleaned to form said liquid coating thereover; and
    at least a portion of the first cleaning liquid can be transformed to a continuous coherent solid by a solidification process that does not damage the solid surface to be cleaned;
  (b) applying to the liquid coating of the first cleaning liquid formed in operation (a) said solidification process, such that said liquid coating is converted to a solid coating; and
  (c) removing the solid coating that was formed in operation (b) by contacting said solid coating with a second aqueous based liquid having a pH of 7 or higher that dissolves, disperses, or both dissolves and disperses the solid coating during the time of said contacting;
wherein in said first cleaning liquid:
  there is a concentration that is from about 1.5 to about 7% of one or more polymers of monomers selected from the group consisting of acrylic and methacrylic acids and the salts, esters, amides, and nitriles of acrylic and methacrylic acids;
  there is a concentration from about 1.2 to about 5.0 ppt of a surfactant component of molecules selected from the group consisting of substances that have in each molecule:
    an imidazoline moiety; and
    a hydrophobe moiety that satisfies all of the following conditions:
      it is attached to the carbon atom in said imidazoline moiety that is directly bonded to both nitrogen atoms;
      it has at least 8 carbon atoms;
      it contains no atoms other than carbon, hydrogen, nitrogen, and oxygen; and
      if it contains any atoms of nitrogen or oxygen, it contains such atoms in a number having a ratio to the number of carbon atoms in said hydrophobe moiety that is not more than about 0.15:1.0; and
    at least one substituent moiety bonded to a nitrogen atom in the imidazoline moiety, said substituent moiety being selected from the group consisting of:
      hydroxymethyl and hydroxyethyl moieties;
      moieties derived from propanoic acid and 2-methyl propanoic acid by removing from each molecule thereof one hydrogen atom that is not the one that is part of the characteristic —COOH moiety of a carboxylic acid; and
      carbonate moieties.

6. A process for cleaning a solid surface that removes contaminant particles, said process comprising the following operations:
  (a) forming over the solid surface to be cleaned a liquid coating of a first cleaning liquid comprised of water, a component of dissolved solid selected from the group consisting of at least partially hydrolyzed poly (vinyl acetate), soluble nylon and gelatin hydrolyzate, an amphoteric surfactant and a preservative;
  (b) drying said liquid coating to form a solid coating; and
  (c) removing the solid coating that was formed in operation (b) by contacting said solid coating with a second aqueous liquid having a pH value between about 1.0 and 6.1.

7. A process according to claim 6 wherein at least 50% of the component of dissolved solid is selected from the group consisting of partially hydrolyzed poly(vinyl acetate) and soluble nylon.

8. A process according to claim 6 wherein there is a concentration of at least about 0.8 ppt of a surfactant component of molecules selected from the group consisting of substances that have in each molecule:
  an imidazoline moiety; and
  a hydrophobe moiety that satisfies all of the following conditions:
    it is attached to the carbon atom in said imidazoline moiety that Is directly bonded to both nitrogen atoms;
    it has at least 8 carbon atoms;
    it contains no atoms other than carbon, hydrogen, nitrogen, oxygen, phosphorus, sulfur, and halogens; and
    if it contains any atoms of nitrogen, oxygen, phosphorus, or sulfur, it contains such atoms in a number having a ratio to the number of carbon atoms in said hydrophobe moiety that is not more than about 0.34:1.0.

9. A process according to claim 7 wherein: there is a concentration of at least about 1% of partially hydrolyzed poly(vinyl acetate) that has a weight average molecular weight that is from about $2 \times 10^4$ to about $50 \times 10^4$ a degree of hydrolysis that is from about 50 to about 99%.

10. A process for cleaning a solid surface that removes contaminant particles, said process comprising the following operations:
  (a) forming over the solid surface to be cleaned a liquid coating of a first cleaning liquid comprised of water, one or more polymers of monomers selected from the group consisting of acrylic and methacrylic acids and the salts, esters, amides, and nitriles of acrylic and methacrylic acids, an amphoteric surfactant and a preservative;
(b) drying said liquid coating to form a solid coating; and
(c) removing the solid coating that was formed in operation (b) by contacting said solid coating with a second aqueous liquid having a pH value of 7.0 or higher;
wherein said amphoteric surfactant is constituted of molecules selected from the group consisting of substances that have in each molecule:
an imidazoline moiety; and
a hydrophobe moiety that satisfies all of the following conditions:
it is attached to the carbon atom in said imidazoline moiety that is directly bonded to both nitrogen atoms;
it has at least 8 carbon atoms;
it contains no atoms other than carbon, hydrogen, nitrogen, and oxygen; and
if it contains any atoms of nitrogen or oxygen, it contains such atoms in a number having a ratio to the number of carbon atoms in said hydrophobe moiety that is not more than about 0.15:1.0; and
at least one substituent moiety bonded to a nitrogen atom in the imidazoline moiety, said substituent moiety being selected from the group consisting of:
hydroxymethyl and hydroxyethyl moieties;
moieties derived from propanoic acid and 2-methyl propanoic acid by removing from each molecule thereof one hydrogen atom that is not the one that is part of the characteristic —COOH moiety of a carboxylic acid; and
carbonate moieties.

* * * * *

UNITED STATES PATENT AND TRADEMARK OFFICE
CERTIFICATE OF CORRECTION

PATENT NO.        : 7,204,890 B2
APPLICATION NO.   : 10/182480
DATED             : April 17, 2007
INVENTOR(S)       : Held, III et al.

Page 1 of 1

It is certified that error appears in the above-identified patent and that said Letters Patent is hereby corrected as shown below:

Title page, (22) PCT FILED, delete "Jan. 19, 2001" and insert therefor --Jan. 29, 2001--.

Column 22
Line 47, delete "Is" and insert therefor --is--.
Line 61, insert --and-- between "a" and "degree".

Signed and Sealed this

Thirty-first Day of July, 2007

JON W. DUDAS
*Director of the United States Patent and Trademark Office*